US012732960B2

(12) United States Patent
Lauridsen et al.

(10) Patent No.: US 12,732,960 B2
(45) Date of Patent: Sep. 8, 2026

(54) PAGING ENHANCEMENT MECHANISM

(71) Applicant: Nokia Technologies Oy, Espoo (FI)

(72) Inventors: Mads Lauridsen, Aalborg (DK); Daniela Laselva, Aalborg (DK); Chunli Wu, Beijing (CN); Jussi-Pekka Koskinen, Oulu (FI); Jorma Johannes Kaikkonen, Oulu (FI); Laura Luque Sanchez, Aalborg (DK); Frank Frederiksen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 239 days.

(21) Appl. No.: 18/552,868

(22) PCT Filed: Apr. 9, 2021

(86) PCT No.: PCT/CN2021/086278
§ 371 (c)(1),
(2) Date: Sep. 27, 2023

(87) PCT Pub. No.: WO2022/213392
PCT Pub. Date: Oct. 13, 2022

(65) Prior Publication Data
US 2024/0196371 A1 Jun. 13, 2024

(51) Int. Cl.
*H04W 68/02* (2009.01)
*H04W 68/00* (2009.01)

(52) U.S. Cl.
CPC ......... *H04W 68/02* (2013.01); *H04W 68/005* (2013.01)

(58) Field of Classification Search
CPC ............................ H04W 68/02; H04W 68/005
(Continued)

(56) References Cited

U.S. PATENT DOCUMENTS

2012/0122495 A1* 5/2012 Weng .................. H04W 68/025 455/458
2020/0120636 A1 4/2020 Su et al.
(Continued)

FOREIGN PATENT DOCUMENTS

CN 108574938 A 9/2018
WO 2012/125093 A1 9/2012
(Continued)

OTHER PUBLICATIONS

"3rd Generation Partnership Project; Technical Specification Group Radio Access Network; NR; User Equipment (UE procedures in Idle mode and RRC Inactive state (Release 16)", 3GPP TS 38.304, V16.3.0, Dec. 2020, pp. 1-39.
(Continued)

*Primary Examiner* — Mark G. Pannell
(74) *Attorney, Agent, or Firm* — Robert P. Michal, Esq.; Rimon PC

(57) ABSTRACT

Embodiments of the present disclosure relate to devices, methods, apparatuses and computer readable storage media of paging enhancement mechanism. The method comprises: in accordance with a determination that no early paging indication is received from a second device during a set of indication occasions, determining, at a first device, whether a paging-related condition is met, the early paging indication addressing a set of paging occasions, the second device serving the first device; in accordance with a determination that the paging-related condition is met, refraining from monitoring for paging message on the set of paging occasions; and in accordance with a determination that the paging-related condition is not met, monitoring for the paging message on the set of paging occasions. As such, the paging mechanism performed between the terminal device
(Continued)

and the network device can be adapted to the network conditions, reliability, power consumption and so on.

18 Claims, 5 Drawing Sheets

(58) Field of Classification Search
USPC .......................................................... 455/458
See application file for complete search history.

(56) References Cited

U.S. PATENT DOCUMENTS

2023/0108646 A1* 4/2023 Tseng .................. H04W 68/025 455/458
2023/0209464 A1* 6/2023 Tsai .................. H04W 52/0216 370/311
2023/0354198 A1* 11/2023 Nader ............... H04W 52/0229
2023/0422211 A1* 12/2023 Esswie ................ H04W 72/232
2024/0064699 A1* 2/2024 Fu ......................... H04W 68/00
2024/0163844 A1* 5/2024 Ma ........................ H04W 68/02

FOREIGN PATENT DOCUMENTS

WO 2020/216242 A1 10/2020
WO 2020/252412 A1 12/2020
WO 2021/023501 A1 2/2021
WO 2022/151059 A1 7/2022

OTHER PUBLICATIONS

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.
"New WID: UE Power Saving Enhancements", 3GPP TSG RAN Meeting #86, RP-193239, Agenda: 9.1.2, MediaTek Inc, Dec. 9-12, 2019, 5 pages.
"[POST112-e][064][Pow17] Group Determination", 3GPP TSG-RAN WG2 #113 electronic, R2-2100389, Agenda: 8.9.2, Intel Corporation, Jan. 25-Feb. 5, 2021, 43 pages.
"3rd Generation Partnership Project; Technical Specification Group Radio Access Network; NR; Physical layer procedures for control (Release 16)", 3GPP TS 38.213, V16.4.0, Dec. 2020, pp. 1-181.
"3rd Generation Partnership Project; Technical Specification Group Radio Access Network; NR; Medium Access Control (MAC) protocol specification (Release 16)", 3GPP TS 38.321, V16.3.0, Dec. 2020, pp. 1-156.
"New WID on support of reduced capability NR devices", 3GPP TSG RAN Meeting #90e, RP-202933, Agenda: 9.1.1, Ericsson, Dec. 7-11, 2020, 5 pages.
"3rd Generation Partnership Project; Technical Specification Group Radio Access Network; Evolved Universal Terrestrial Radio Access (E-UTRA); User Equipment (UE) procedures in idle mode (Release 16)", 3GPP TS 36.304, V16.3.0, Dec. 2020, pp. 1-64.
"Summary for Paging Enhancements", 3GPP TSG RAN WG1 e-Meeting #104, R1-210XXXX, Agenda: 8.7.1.1, MediaTek, Jan. 25-Feb. 5, 2021, 15 pages.
"IEEE 802.11", Wikipedia, Retrieved on Sep. 26, 2023, Webpage available at : https://en.wikipedia.org/wiki/IEEE_802.11.
International Search Report and Written Opinion received for corresponding Patent Cooperation Treaty Application No. PCT/CN2021/086278, dated Jan. 6, 2022, 10 pages.
"Paging Enhancements for UE Power Saving in NR", 3GPP TSG-RAN WG2 Meeting #111 electronic, R2-2008361, Agenda: 8.9.2, MediaTek Inc, Aug. 17-28, 2020, pp. 1-8.
"Paging enhancement(s) for UE power saving in Idle/inactive mode", 3GPP TSG RAN WG1 Meeting #104-e, R1-2100216, Agenda: 8.7.1.1, Huawei, Jan. 25-Feb. 5, 2021, 16 pages.
Extended European Search Report received for corresponding European Patent Application No. 21935616.9, dated Nov. 20, 2024, 8 pages.
"Design of paging early indication for idle/inactive-mode UE power saving", 3G PP TSG RAN WG1 #104-e, R1-2100591, Agenda Item: 8.7.1.1, MediaTek Inc., Jan. 25-Feb. 5, 2021, 9 pages.
"On Potential Paging Enhancement", 3GPP TSG RAN WG1 Meeting #103-e, R1-2008287, Agenda item: 8.7.1.1, Panasonic, Oct. 26-Nov. 6, 2020, 11 pages.
Office action received for corresponding European Patent Application No. 21935616.9, dated Sep. 3, 2025, 6 pages.
Summons to attend oral proceedings pursuant to Rule 115(1) EPC issued by the European Patent Office in relation to European Application No. 21 935 616.9 dated Jun. 10, 2026 (6 pages).

* cited by examiner

PAGING ENHANCEMENT MECHANISM

RELATED APPLICATION

This application claims priority to PCT Application No. PCT/CN2021/086278, filed on Apr. 9, 2021, each of which is incorporated herein by reference in its entirety.

FIELD

Embodiments of the present disclosure generally relate to the field of telecommunication and in particular, to methods, devices, apparatuses and computer readable storage media for a paging enhancement mechanism.

BACKGROUND

In a legacy communication network, e.g., in LTE system, a terminal device (e.g., UE) may operate in a discontinuous reception (DRX) or an extended discontinuous reception (eDRX) mode for the purpose of power saving. The paging procedure is used in the DRX or eDRX mode to implement real-time performances and improve the reachability of the termina device. Take the eDRX as an example, during a paging transmission window (PTW) of each eDRX cycle, the terminal device monitors a paging channel on paging occasions (POs), and attempt to receive a paging message. In order to further reduce power consumption, a paging early indication (PEI) may be introduced to indicate a potential paging on one or more upcoming POs.

As one of the implementations, if a terminal device receives a PEI on a set of PEI occasions, which indicates that the terminal device should monitor on one or more upcoming POs, the terminal device then monitors the paging channel on the POs indicated by the PEI. Otherwise, if no PEI is received by the terminal device on the set of PEI occasions, the terminal device may determine that the paging channel is not required to be monitored on corresponding POs, which is also known as "UE behavior A" in respect to PEI and PO monitoring. As another of the implementations, the PEI may indicate whether or not the terminal device should monitor on the upcoming POs, and the terminal device may determine whether to monitor the paging channel based on the particular content indicated by the PEI. Moreover, if no PEI is received by the terminal device on the set of PEI occasions, the terminal device may determine that the paging channel is required to be monitored on the corresponding POs, which is also known as "UE behavior B" in respect to PEI and PO monitoring. Thus, there is a need for an enhanced paging mechanism that is adaptive to both UE behaviors in respect to PEI and PO monitoring.

SUMMARY

In general, example embodiments of the present disclosure provide a solution for an enhanced paging mechanism.

In a first aspect, there is provided a first device. The first device comprises at least one processor; and at least one memory including computer program code; the at least one memory and the computer program code are configured to, with the at least one processor, cause the first device to: in accordance with a determination that no early paging indication is received from a second device during a set of indication occasions, determine whether a paging-related condition is met, the early paging indication addressing a set of paging occasions, the second device serving the first device; in accordance with a determination that the paging-related condition is met, refrain from monitoring for a paging message on the set of paging occasions; and in accordance with a determination that the paging-related condition is not met, monitor for the paging message on the set of paging occasions.

In a second aspect, there is provided a second device. The second device comprises at least one processor; and at least one memory including computer program code, the at least one memory and the computer program code are configured to, with the at least one processor, cause the second device to: determine whether a paging-related condition is met; in accordance with a determination that the paging-related condition is met, perform a paging procedure with a first device based on a first paging scheme where no early paging indication is transmitted on a set of indication occasions in response to a paging channel between the first device and the second device not to be monitored on a set of paging occasions corresponding to the early paging indication, the second device serving the first device; and in accordance with a determination that the paging-related condition is not met, perform the paging procedure with the first device based on a second paging scheme where no early paging indication is transmitted on the set of indication occasions in response to the paging channel to be monitored on the set of paging occasions.

In a third aspect, there is provided a method. The method comprises: in accordance with a determination that no early paging indication is received from a second device during a set of indication occasions, determining, at a first device, whether a paging-related condition is met, the early paging indication addressing a set of paging occasions, the second device serving the first device; in accordance with a determination that the paging-related condition is met, refraining from monitoring for a paging message on the set of paging occasions; and in accordance with a determination that the paging-related condition is not met, monitoring for the paging message on the set of paging occasions.

In a fourth aspect, there is provided a method. The method comprises: determining, at a second device, whether a paging-related condition is met; in accordance with a determination that the paging-related condition is met, performing a paging procedure with a first device based on a first paging scheme where no early paging indication is transmitted on a set of indication occasions in response to a paging channel between the first device and the second device not to be monitored on a set of paging occasions corresponding to the early paging indication, the second device serving the first device; and in accordance with a determination that the paging-related condition is not met, performing the paging procedure with the first device based on a second paging scheme where no early paging indication is transmitted on the set of indication occasions in response to the paging channel to be monitored on the set of paging occasions.

In a fifth aspect, there is provided a first apparatus. The first apparatus comprises: means for in accordance with a determination that no early paging indication is received from a second device during a set of indication occasions, determining whether a paging-related condition is met, the early paging indication addressing a set of paging occasions, the second device serving the first device; means for in accordance with a determination that the paging-related condition is met, refraining from monitoring for a paging message on the set of paging occasions; and means for in accordance with a determination that the paging-related condition is not met, monitoring for the paging message on the set of paging occasions.

In a sixth aspect, there is provided a second apparatus. The second apparatus comprises: means for determining whether a paging-related condition is met; means for in accordance with a determination that the paging-related condition is met, performing a paging procedure with a first device based on a first paging scheme where no early paging indication is transmitted on a set of indication occasions in response to a paging channel between the first device and the second device not to be monitored on a set of paging occasions corresponding to the early paging indication, the second device serving the first device; and means for in accordance with a determination that the paging-related condition is not met, performing the paging procedure with the first device based on a second paging scheme where no early paging indication is transmitted on the set of indication occasions in response to the paging channel to be monitored on the set of paging occasions.

In a seventh aspect, there is provided a non-transitory computer readable medium comprising program instructions for causing an apparatus to perform at least the method according to the above third aspect.

In an eighth aspect, there is provided a non-transitory computer readable medium comprising program instructions for causing an apparatus to perform at least the method according to the above fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
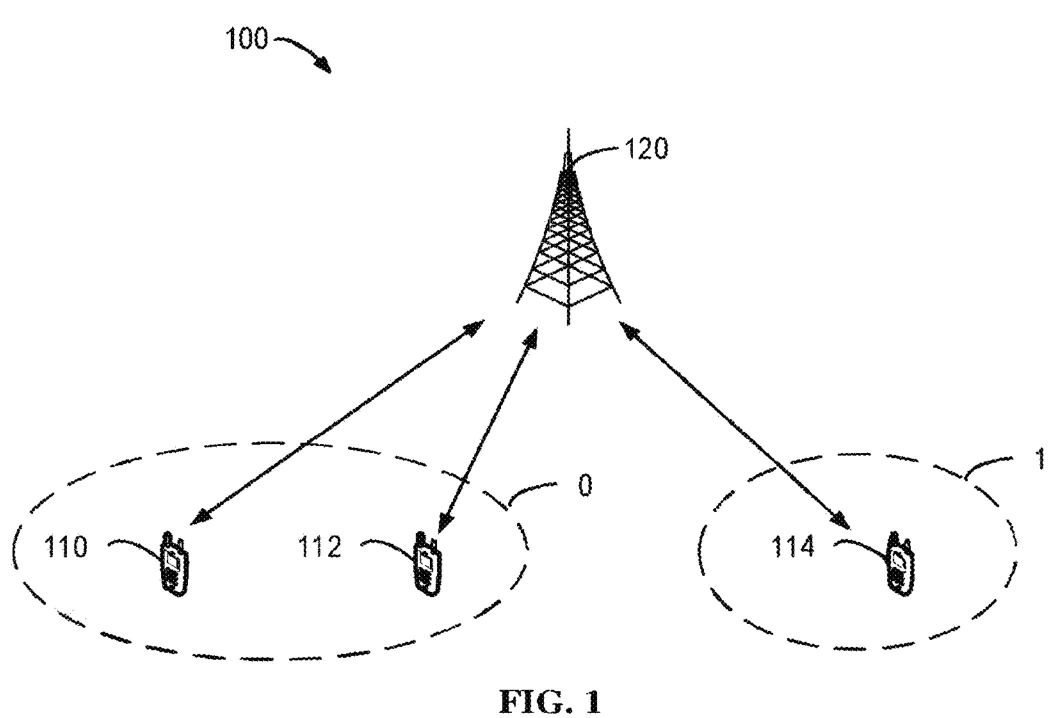
FIG. 1 illustrates an example communication environment in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/of" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems, including but not limited to a terrestrial communication system, a non-terrestrial communication system or a combination thereof. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

From the perspective of communication network, the "UE Behavior A" is beneficial to reduce the resource-consuming since the network device (e.g., gNB) may avoid transmitting PEI whenever no terminal device in a PO group or sub-groups has to be paged. However, in a case where the network device fails to transmit the PEI due to a collision, it may delay the paging for the terminal device.

On the contrary, the communication network may select the "UE behavior B" to ensure the power saving of the terminal device. As mentioned above, in "UE behavior B", the network device needs to transmit the PEI even if none of the terminal devices in any subgroup is going to be paged. As long as there is at least one subgroup to be paged on a PO but not all subgroups are to be paged, there is difference from the point of view of signaling used in "UE behavior A" and "UE behavior B". In a case where all or most of the terminal devices in all subgroups are to be indicated to monitor, "UE behavior B" would be resource efficient, since the communication network may not to transmit the PEI at all.

From the above discussion, "UE behavior A" and "UE behavior B" each have their own specific application scenarios, and currently there is no solution for dynamically switching between "UE behavior A" and "UE behavior B" to adapt the network conditions, network load, reliability and other factors.

In order to solve the above and other potential problems, embodiments of the present disclosure provide a paging enhancement mechanism. In general, the paging enhancement mechanism can take multiple factors into considerations and dynamically adjust the UE behavior in respect to PEI monitoring. By this way, the network device is allowed to adapt the "PEI signaling load" to current conditions. This will be helpful, because the communication network needs to multiplex the PEI with other transmissions, which may have higher priority.

Example embodiments of the present disclosure will be described in detail below with reference to the accompanying drawings. Principle and embodiments of the present disclosure will be described in detail below with reference to the accompanying drawings.

FIG. 1 illustrates an example communication environment 100 in which embodiments of the present disclosure may be implemented. The communication environment 100 includes a first device 110, a second device 120, and terminal devices 112 and 114.

The first device 110 and the terminal devices 112 and 114 are terminal devices located within a coverage of the second device 120. The type of the first device 110 and the terminal devices 112 and 114 may or may not be the same, including but not limited to, reduced capability device (e.g., RedCap), a device supporting enhanced mobile broadband, a device supporting MutiSIM, and so on.

In the example embodiments, the first device 110 and the terminal devices 112 and 114 may operate in DRX or eDRX mode. For example, the first device 110 may operate in eDRX mode, and in the RRC inactive state, the first device 110 may monitor the paging channel for paging messages during the PTW configured by the second device 120.

Specifically, the PTW may include a set of paging occasions (PO), and the first device 110 may monitor the paging channel on each of the POs. Upon receipt of the paging message including the first device 110's NAS identity, the first device 110 may then establish the RRC connection to receive the DL data transmission.

The second device 120 may be network devices in the RAN, for example, a base station. In the context of the example embodiments, the second device 120 may act as a serving network device of the first device 110 and the terminal devices 112 and 114. As showing in FIG. 2, the first device 110 and the terminal devices 112 are grouped into subgroup 0, and the terminal device 114 belong to subgroup 1. The subgroups may be configured by the second device 120.

The second device 120 may configure DRX and eDRX configurations with the first device 110 and the terminal devices 112 and 114. For example, the eDRX configurations may include, but not limited to, the eDRX cycle, the H-SFN including the PTW and PH, the On-duration timer, the inactivity timer, the DRX start offset, the DRX retransmission timer and so on. With the eDRX configurations, the first device 110 and the terminal devices 112 and 114 may determine when to enters the RRC inactive state or RRC idle state and when to monitor the paging channel.

Further, the second device 120 may transmit PEI to the first device 110 and the terminal devices 112 and 114 for indicating a monitoring behavior on a set of POs. In other words, the PEI may address a set of POs. As discussed above, there are mainly two types of monitoring behaviors, i.e., "UE behavior A" and "UE behavior B", which may also be referred to as "a first paging scheme" and "a second paging scheme" in the context of the present disclosure.

In the first paging scheme, a PEI may be transmitted on a set of PEI occasions to indicate that the terminal device should monitor on one or more upcoming POs. Upon receipt of the PEI, the terminal device may monitor the paging channel on the POs indicated by the PEI. Otherwise, if no PEI is received by the first device 110 on the set of PEI occasions, the first device 110 may determine that the paging channel is not required to be monitored on corresponding POs.

In the second paging scheme, the PEI may be transmitted to indicate whether or not the first device 110 should monitor on the upcoming POs. Upon receipt of the PEI, the first device 110 may determine whether to monitor the paging channel based on the particular content indicated by the PEI. Moreover, if no PEI is received by the first device 110 on the set of PEI occasions, the first device 110 may determine that the paging channel is required to be monitored on the corresponding POs.

It is to be understood that the terms "PEI", "paging early indication" and "early paging indication" can be used interchangeably in the context of the present disclosure, and refer to the same meaning of an indication that addresses a set of POs. Further, the number of network devices, terminal devices and/or cells is given for the purpose of illustration without suggesting any limitations to the present disclosure. The communication environment 100 may include any suitable number of network devices, terminal devices and/or cells adapted for implementing implementations of the present disclosure. Although not shown, it would be appreciated that one or more additional devices may be located in the cells 102 and 104, and one or more additional cells may be deployed in the environment 100.

Only for ease of discussion, the first device 110 and the terminal device 112 and 114 are illustrated as UEs, and the second device 120 is illustrated as a base station. It is to be understood that base station and UE are only example implementations of the first device 110, the second device 120 and terminal devices 112 and 114, without suggesting any limitation as to the scope of the present application. Any other suitable implementations are possible as well.

Communications in the communication network 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
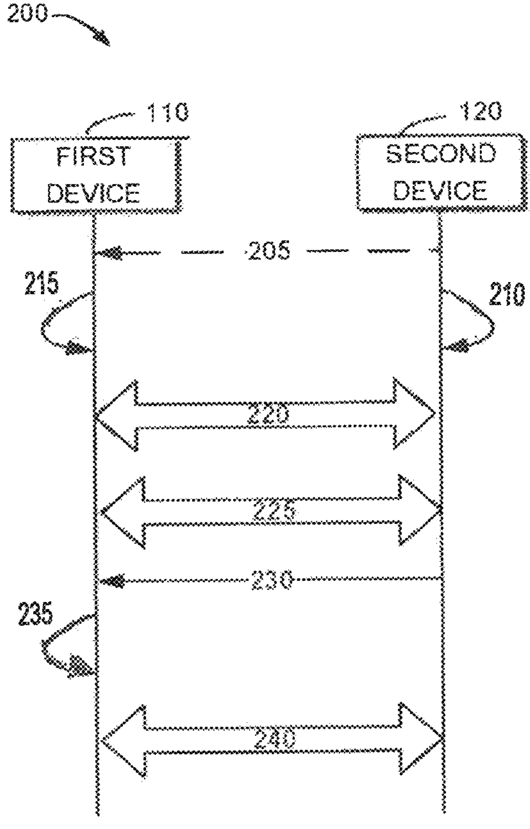
FIG. 2 illustrates a signaling flow for a paging early indication procedure in accordance with some example embodiments of the present disclosure.

To better understand the state transition reporting procedure proposed in the disclosure, reference is now made to FIG. 2, which illustrates a signaling flow for a paging early indication procedure in accordance with some example embodiments of the present disclosure. The signaling flow 200 may involve the first device 110 and the second device 120 as illustrated in FIG. 1. For the purpose of discussion, the signaling flow 200 will be described with reference to FIG. 1.

In the signaling flow 200, the second device 120 may transmit 205 a configuration message for configuring the paging-related condition. The paging-related condition may relate to various factors, such as, a paging cycle, a paging probability, subgroups of the terminal device and so on, which will be discussed in details below.

In some example embodiments, the paging-related condition may be preconfigured or predetermined at the first device 110 and the second device 120. In this case, the transmission 205 of the configuration message may not be necessary for the process 200.

In some example embodiments, the paging-related condition may be a set of POs comprising one PO. For example, if a single PO in a paging frame (PF) is mapped to one PEI, the paging-related condition is met, and the paging procedure is to be performed based on the first paging scheme. Otherwise, if more than one PO in a PF is mapped to one PEI, the paging-related condition is not met, and in this case the paging procedure is to be performed based on the second paging scheme, since a cumulative paging probability may increase triggering PEI transmission in such case.

The configurations where the paging-related condition is met and the configurations where the paging-related condition is not met may be interchanged. In some other example embodiments, the paging-related condition may be the set of POs comprising more than one PO.

In some other example embodiments, the paging-related condition may be a number of the set of POs being not exceeding a threshold number of POs. By this way, one of above configurations may be considered to be a default scheme.

In some example embodiments, the paging-related condition may be a paging probability of the first device 110 being below a threshold paging probability. For example, if the paging probability of the first device 110 is below the threshold paging probability, the paging-related condition is met, and the paging procedure is to be performed based on the first paging scheme. Otherwise if the paging probability of the first device 110 is not below the threshold paging probability, the paging-related condition is not met, and in this case the paging procedure is to be performed based on the second paging scheme.

The configurations where the paging-related condition is met and the configurations where the paging-related condition is not met may be interchanged. In some other example embodiments, the paging-related condition may be the paging probability of the first device 110 being not below the threshold paging probability.

In this case, the first device 110 may determine which paging scheme is to be selected by comparing its paging probability with the threshold paging probability. The paging probability of the first device 110 may be obtained from the second device 120. Further, the first device 110 may receive, from the second device 120, a configuration message for configuring the threshold paging probability, for example, 10%, 20%, etc.

In some example embodiments, a subgroup of the terminal devices has a subgroup paging probability, for example, the first device 110 and the terminal device 112 have the subgroup paging probability of subgroup 0, and the terminal device 114 has the subgroup paging probability of subgroup 1. The threshold paging probability may be a threshold paging probability for a subgroup including the first device 110, and in this case, the paging scheme determined from the first paging scheme is to be applied per subgroup. In some example embodiments, the paging probability of the first device 110 may be a PO or PF paging probability.

In some example embodiments, the paging-related condition may be a paging cycle length of the first device 110 being below a threshold paging cycle length. The first device 110 may further receive, from the second device 120, a configuration message for configuring the threshold paging cycle length. If the paging cycle length of the first device 110 is below the threshold paging cycle length, the paging-related condition is met, and the paging procedure is to be performed based on the first paging scheme. Otherwise, if the paging cycle length of the first device 110 is not below the threshold paging cycle length, the paging-related condition is not met, and in this case the paging procedure is to be performed based on the second paging scheme.

The configurations where the paging-related condition is met and the configurations where the paging-related condition is not met may be interchanged. In some other example embodiments, the paging-related condition may be the paging cycle length being not below the threshold paging cycle length. The threshold paging cycle length may be configured by the second device 120 or the core network, and the scope of the present disclosure is not limited in this regard.

For another example, the paging-related condition may be the first terminal device 110 operating in a mode other than the eDRX mode. In this example, if the first terminal device 110 operates in the eDRX mode, the paging-related condition is met, and the paging procedure is to be performed based on the first paging scheme. Otherwise, if the first terminal device 110 operates in a mode other than the eDRX mode, such as, DRX mode, the paging-related condition is not met, and the paging procedure is to be performed based on the second paging scheme. Likewise, the configurations where the paging-related condition is met and the configurations where the paging-related condition is not met may be interchanged.

In some example embodiments, the paging-related condition may be the subgroup comprising the first device 110, i.e., subgroup 0 corresponding to a first assignment, and the first paging scheme is to be performed for the first assignment. The first device 110 may refrain from monitoring for the paging message on the set of POs in accordance with receipt of no PEI according to the first paging scheme. Likewise, the configurations where the paging-related condition is met and the configurations where the paging-related condition is not met may be interchanged. For example, the paging-related condition may be the subgroup 0 corresponding to a second assignment, and the second paging scheme is to be performed for the second assignment. In this case, the first device 110 may monitor for the paging message on the set of POs in accordance with receipt of no PEI according to the second paging scheme.

The first device 110 may further receive, from the second device 120, a bitmap for mapping subgroups and the first and second assignments. Alternatively, for subgroups 0 to N, the first device 110 may receive an indication message from the second device 120 for indicating a threshold X, where X and N are positive integers, and X≤N. For example, the indication message may indicate that the subgroups 0: X−1 correspond to the first assignment, and the subgroups X: N correspond to the second assignment. If there are only terminal devices in subgroups corresponding to the second assignment (i.e., applying behavior B) are to be paged, the second device 120 may not transmit PEI. If there is a mix of terminal devices corresponding to the first and second assignments (i.e., with behaviors of both subgroups), the first device 110 may receive the PEI with explicit indication of which subgroups are to be paged.

In some example embodiments, the paging-related condition may be at least one of a reduced capability device (e.g., RedCap), a device supporting enhanced mobile broadband or a device supporting MutiSIM. For example, the RedCap type of terminal devices may be paged based on the first paging scheme, while eMBB type of terminal devices may be paged based on the second paging scheme. For another example, the terminal device supporting MultiSIM may be paged based on the first paging scheme, and in a case that the PEI is missed, the terminal device will not monitor the paging channel on the POs, such that the number of times to monitor POs is minimized.

In some example embodiments where the second paging scheme is defined as a default paging scheme, the first device 110 may receive, from the second device 120, paging downlink control information (DCI) with a target indicator for indicating the paging procedure performed based on the first paging scheme. Additionally, or alternatively, the first device 110 may receive, from the second device 120, the paging DCI without a target indicator for indicating the paging procedure performed based on the second paging scheme.

In some example embodiments where the first paging scheme is defined as a default paging scheme, the first device 110 may receive, from the second device 120, the paging DCI with the target indicator for indicating the paging procedure performed based on the second paging scheme. Additionally, or alternatively, the first device 110 may receive, from the second device 120, the paging DCI without a target indicator for indicating the paging procedure performed based on the first paging scheme.

The target indicator may be, for example, the spare bits in the paging DCI. With the target indicator, the first device 110 may be aware of a switching between the first paging scheme and the second paging scheme.

In some example embodiments, the target indicator for indicating the paging scheme may be included in a PEI transmitted to the first device 110. As such, all the terminal devices that receive the PEI with the target indicator may change their paging scheme.

In some example embodiments, the paging-related condition may be a reception mode of the first device 110 is the DRX mode. For example, if the reception mode of the first device 110 is the DRX mode, the paging-related condition is met, and the paging procedure is to be performed based on the first paging scheme. Otherwise, if the reception mode of the first device 110 is the eDRX mode, the paging-related condition is not met, and the paging procedure is to be performed based on the second paging scheme.

Likewise, the configurations where the paging-related condition is met and the configurations where the paging-related condition is not met may be interchanged. In some other example embodiments, the paging-related condition may be the reception mode of the first device 110 is the eDRX mode.

The first device 110 determines 210 whether the paging-related condition is met. Likewise, the second device 120 determines 215 whether the paging-related condition is met. Since the first device 110 and the second device 120 have the same knowledge about the paging-related condition, a paging procedure is performed between the first device 110 and the second device 120 based on the same paging scheme selected from the first and second paging schemes.

If the paging-related condition is met, the paging procedure may be performed 220 based on a first paging scheme where no PEI is transmitted on a set of indication occasions in response to the paging channel between the first device 110 and the second device 120 not to be monitored on a set of POs corresponding to the PEI. In this case, the first device 110 refrains from monitoring for a paging message on the set of POs.

If the paging-related condition is not met, the paging procedure may be performed 225 based on a second paging scheme where no PEI is transmitted on the set of indication occasions in response to the paging channel to be monitored on the set of POs. In this case, the first device 110 monitors for the paging message on the set of POs.

For ease of description, in the process 200 as well as other embodiments of the present disclosure, a single paging-related condition is taken into consideration in determining the UE behavior for monitoring paging. It should be understood that, the solution provided in the present disclosure is also possible when taking more than one paging-related conditions into consideration. The scope of the present disclosure is not limited in this regard.

In some example embodiments, the second device 120 may transmit 230 an indication message for indicating a paging scheme to be performed for monitoring for the paging message. The indication message may indicate whether the first paging scheme or the second paging scheme is to be performed.

Upon receipt of the indication message, the first device 110 may determine the paging scheme. In some example embodiments where the paging scheme indicated by the indication message is different from the current paging scheme used for the paging procedure between the first device 110 and the second device 120, the first device 110 may determine 235 that the current paging scheme is to be switched to the indicated paging scheme. The paging procedure between the first device 110 and the second device 120 may be then performed 240 based on the indicated paging scheme. In this way, the second device 120 may explicitly indicate the paging scheme selected for performing the paging procedure.

Figure 3:
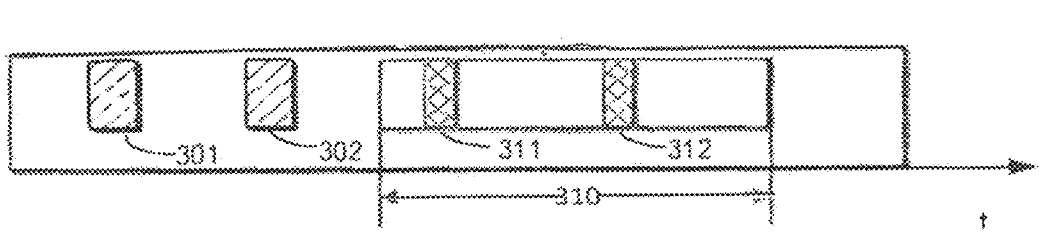
FIG. 3 illustrates a schematic diagram of a paging early indication procedure for eDRX in accordance with some example embodiments of the present disclosure.

The example embodiments of the present disclosure also provide a paging mechanism for eDRX. To understand the paging mechanism for eDRX proposed in the present disclosure, reference is now made to FIG. 3. As shown in FIG. 3, the PEI 301, which occurs before the PTW 310 of the eDRX in time domain, is associated with the PTW 310. Specifically, the first device 110 may monitor for the PEI 301 based on the second paging scheme. If the first device 110 receives the PEI 301 indicating that the first device 110 shall monitor the paging channel during the PTW 310 or alternatively, if the first device 110 does not receive the PEI 301, the first device 110 may determine that the paging channel is required to be monitored within PTW 310. Otherwise, the first device 110 may determine not to monitor the paging channel during the whole PTW 310.

For the POs 311 and 312 within the PWT 310, the first device 110 may monitor the paging channel based on the first paging scheme. For example, the first device 110 receives the PEI 302 that corresponds to the PO 311 and thus the first device 110 may then monitor paging channel on PO 311. As for PO 312, since no corresponding PEI is received, the first device 110 may determine that the paging channel is not required to be monitored on the PO 312. In these embodiments, the second device 120 may perform the paging procedure with the first device 110 based on the first paging scheme during the PTW.

It is to be understood that the example implementation, configurations, thresholds, values are given for purpose of illustration without any limitation. It is also to be understood that the indication message, the configuration message as well as other additional message or information as described in details above may be transmitted via a RRC message or SIB. The scope of the present disclosure is not limited in this regard The example embodiments of the present disclosure provide an adaptive paging mechanism. The network device can switch UE behaviors in respect to PEI monitoring, and thus allowing the communication network to adapt the load of PEI signaling to a current network condition. Further, it is possible to vary the UE behaviors in respect to PEI monitoring from one terminal device to another depending on various factors, such as, a paging cycle, a paging probability, subgroups of the terminal device and so on. As such, a trade-off between the power consumption of the terminal device and a network load can be reached.

Figure 4:
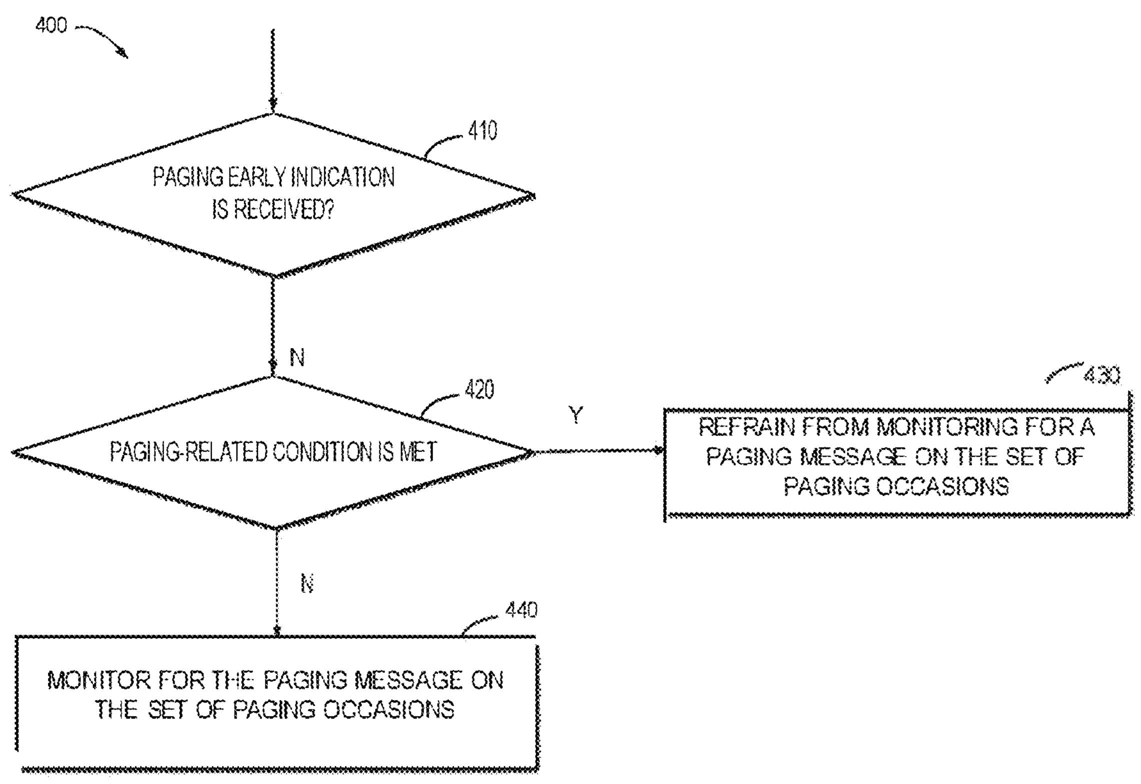
FIG. 4 illustrates a flowchart of a method implemented at a first device in accordance with some example embodiments of the present disclosure.

FIG. 4 shows a flowchart of an example method 400 according to some example embodiments of the present disclosure. The method 400 can be implemented at a device e.g., at the first device 110 as shown in FIG. 1. For the purpose of discussion, the method 400 will be described with reference to FIG. 1.

At 410, the first device 110 determines whether PEI is received from the second device 120 during a set of indication occasions. The PEI may address a set of POs. The second device 120 serves the first device 110.

If no PEI is received during the set of indication occasions, at 420, the first device 110 determines whether a paging-related condition is met. In some example embodiments, the paging-related condition may be preconfigured or predetermined at the first device 110 and a second device 120 serving the first device 110.

In some other example embodiments, the paging-related condition may be configured by the second device 120. For example, the first device 110 may receive, from the second device 120, a configuration message for configuring the paging-related condition.

If the paging-related condition is met, at 430, the first device 110 refrains from monitoring for a paging message on the set of POs, that is, the paging procedure is to be performed based on a first paging scheme. In the first paging scheme, the paging channel between the first device 110 and the second device 120 is not required to be monitored by the first device 110 at a set of POs in accordance with receipt of no PEI on a set of indication occasions.

If the paging-related condition is not met, at 440, the first device 110 monitors for the paging message on the set of POs, that is, the paging procedure is to be performed based on a second paging scheme. In the second paging scheme, the paging channel is required to be monitored by the first device 110 at the set of POs in accordance with receipt of no PEI on the set of indication occasions.

In some other example embodiments, the paging-related condition may be related to an indication message for indicating a monitoring behavior of the first device 110. In these embodiments, the first device 110 may receive, from the second device 120, an indication message for indicating a paging scheme to be performed for monitoring for the paging message.

For example, the indication message may indicate the first paging scheme is to be performed, and the first device 110 refrains from monitoring for the paging message on the set of POs in accordance with receipt of no PEI according to the first paging scheme, that is, the first paging scheme is activated. For another example, the indication message may indicate the second paging scheme is to be performed, and the first device 110 monitors for the paging message on the set of POs in accordance with receipt of no early paging indication according to the second paging scheme, that is, the second paging scheme is activated.

In some example embodiments, the paging-related condition may be a set of POs comprising one PO. For example, if a single PO in a paging frame (PF) is mapped to one PEI, the paging procedure is to be performed based on the first paging scheme. In addition, if more than one PO in a PF is mapped to one PEI, the paging procedure is to be performed based on the second paging scheme, since a cumulative paging probability may increase triggering PEI transmission in such case.

In some other example embodiments, the paging-related condition may be the set of POs comprising more than one PO. By this way, one of the first and second paging scheme may be considered to be a default scheme.

In some example embodiments, the paging-related condition may be a paging probability of the first device 110 being below a threshold paging probability. In some other example embodiments, the paging-related condition may be the paging probability of the first device 110 being not below the threshold paging probability.

In this case, the first device 110 may determine which paging scheme is to be selected by comparing its paging probability with the threshold paging probability. The paging probability of the first device 110 may be obtained from the second device 120. Further, the first device 110 may receive, from the second device 120, a configuration message for configuring the threshold paging probability, for example, 10%, 20%, etc. The threshold paging probability may be a threshold paging probability for a subgroup including the first device 110, and in this case, the paging scheme determined from the first and second paging schemes is to be applied per subgroup.

In some example embodiments, the paging-related condition may be a paging cycle length of the first device 110 being below a threshold paging cycle length. The first device 110 may further receive, from the second device 120, a configuration message for configuring the threshold paging cycle length. In some other example embodiments, the paging-related condition may be the paging cycle length being not below the threshold paging cycle length.

For another example, the paging-related condition may be the first terminal device 110 operating in a mode other than the eDRX mode, and in this case, if the first terminal device 110 operates in the eDRX mode, the first paging scheme is to be activated. Otherwise, if the first device 110 operates in a mode other than the eDRX mode, the second paging scheme is to be activated.

In some example embodiments, the paging-related condition may be a subgroup comprising the first device 110 corresponding to a first assignment, and the first paging scheme is to be performed for the first assignment. In this case, the first device 110 may refrain from monitoring for the paging message on the set of POs in accordance with receipt of no early paging indication according to the first paging scheme.

In some other example embodiments, the paging-related condition may be the subgroup comprising the first device 110 corresponding to a second assignment different from the first assignment, and the second paging scheme is to be performed for the second assignment. In this case, the first device 110 may monitor for the paging message on the set of POs in accordance with receipt of no early paging indication according to the second paging scheme.

The first device 110 may further receive, from the first device 110, a bitmap for mapping subgroups and the first and second assignments. Alternatively, for subgroups 0 to N, the first device 110 may receive an indication message from the second device 120 for indicating a threshold X, where X and N are positive integers, and X≤N. For example, the indication message may indicate that the subgroups 0: X−1 correspond to the first assignment, and the subgroups X: N correspond to the second assignment. If there are only terminal devices in subgroups corresponding to the second assignment (i.e., applying behavior B) are to be paged, the second device 120 may not transmit PEI. If there is a mix of terminal devices corresponding to the first and second assignments (i.e., with behaviors of both subgroups), the first device 110 may receive the PEI with explicit indication of which subgroups are to be paged.

In some example embodiments, the paging-related condition may be a type of the first device 110 comprising one of a reduced capability device (e.g., RedCap), a device supporting enhanced mobile broadband or a device supporting MutiSIM. For example, the RedCap type of terminal devices may be paged based on the first paging scheme, while eMBB type of terminal devices may be paged based on the second paging scheme. For another example, the terminal device supporting MultiSIM may be paged based on the first paging scheme, and in a case that the PEI is missed, the terminal device will not monitor the paging channel on the POs, such that the number of times to monitor POs is minimized.

In some example embodiments where the second paging scheme is defined as a default paging scheme, the first device 110 may receive, from the second device 120, paging downlink control information (DCI) with a target indicator for indicating the paging procedure performed based on the first paging scheme. Additionally, or alternatively, the first device 110 may receive, from the second device 120, the paging DCI without a target indicator for indicating the paging procedure performed based on the second paging scheme.

In some example embodiments where the first paging scheme is defined as a default paging scheme, the first device 110 may receive, from the second device 120, the paging DCI with the target indicator for indicating the paging procedure performed based on the second paging scheme. Additionally, or alternatively, the first device 110 may receive, from the second device 120, the paging DCI without a target indicator for indicating the paging procedure performed based on the first paging scheme.

The target indicator may be, for example, the spare bits in the paging DCI. With the target indicator, the first device 110 may be aware of a switching between the first paging scheme and the second paging scheme.

In some example embodiments, the target indicator for indicating the paging scheme may be included in a PEI transmitted to the first device 110. As such, all the terminal devices that receive the PEI with the target indicator may change their paging scheme.

In some example embodiments, the paging-related condition may be a reception mode of the first device 110 is the DRX mode. In this case, if the first device 110 operates in the DRX mode, the paging-related condition is met. Otherwise, if the first device 110 operates in the eDRX mode, the paging-related condition is not met.

The configurations where the paging-related condition is met and the configurations where the paging-related condition is not met may be interchanged. In some other example embodiments, the paging-related condition may be the reception mode of the first device 110 is the eDRX mode.

In some example embodiments where the first device 110 operates in the eDRX mode, the paging-related condition may be the PEI is not associated with a paging time window (PTW) of an extended discontinuous reception cycle, and the set of POs is within the PTW. In these embodiments, during the PTW, if no further PEI corresponding to one of the set of POs is received from the second device 120, the first device 110 may refrain from monitoring for the paging message on the PO.

For example, the first device 110 that operates in eDRX may apply the second paging scheme when monitoring for a PEI before the PTW, such a PEI is associated with the PTW. For example, if the PEI indicates that the first device 110 shall monitor the paging channel or no PEI is transmitted before the PTW, the terminal device 110 may monitor the paging channel on the POs within the PTW. Moreover, for the POs within the PTW, the first device 110 may apply the first paging scheme per PEI, that is, the first device 110 would not monitor the paging channel on the POs within the PTW if no PEI is transmitted for the PO.

It should be understood that the indication message, the configuration message as well as other additional message or information as described in details above may be transmitted via a RRC message or SIB. The scope of the present disclosure is not limited in this regard.

The example embodiments of the present disclosure provide an adaptive paging mechanism. UE behaviors in respect to PEI monitoring vary from one terminal device to another depending on various factors, such as, a paging cycle, a paging probability, subgroups of the terminal device and so on. As such, a trade-off between the power consumption of the terminal device and a network load can be reached.

Figure 5:
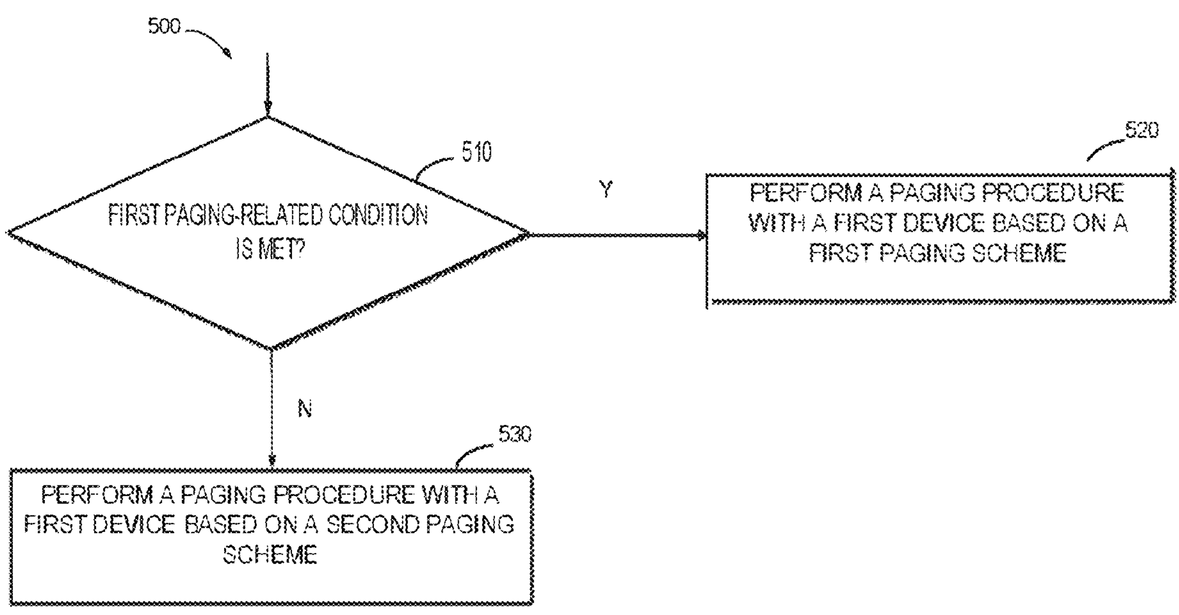
FIG. 5 illustrates a flowchart of a method implemented at a second device in accordance with some example embodiments of the present disclosure.

FIG. 5 shows a flowchart of an example method 500 according to some example embodiments of the present disclosure. The method 500 can be implemented at a device e.g., at the second device 120 as shown in FIG. 1. For the purpose of discussion, the method 500 will be described with reference to FIG. 1.

At block 510, the second device 120 determines whether a paging-related condition is met. The second device 120 serves the first device 110. In some example embodiments, the paging-related condition may be preconfigured or predetermined at the first device 110 and the second device 120.

In some other example embodiments, the paging-related condition may be configured by the second device 120. For example, the second device 120 may transmit a configuration message for configuring the paging-related condition to the first device 110.

If the second device 120 determines, at 510, that the paging-related condition is met, at 520, the second device 120 performs a paging procedure with the first device 110 based on a first paging scheme. In the first paging scheme, no PEI is transmitted on a set of indication occasions in response to a paging channel between the first device 110 and the second device 120 not to be monitored at a set of POs corresponding to the PEI.

If the second device 120 determines, at 510, that the paging-related condition is not met, at 530, the second device 120 performs a paging procedure with the first device 110 based on a second paging scheme. In the second paging scheme, no PEI is transmitted on the set of indication occasions in response to the paging channel to be monitored at the set of POs.

In some other example embodiments, the paging-related condition may be related to an indication message for indicating a monitoring behavior of the first device 110. In these embodiments, the second device 120 may transmit the indication message for indicating a paging scheme to be performed for monitoring for the paging message to the first device 110, the paging is scheme selected from the first paging scheme and the second paging scheme.

For example, the indication message may indicate the first paging scheme is to be performed, that is, the first paging scheme is activated. In this case, the first device 110 is not required to monitor for the paging message on the set of POs in accordance with receipt of no PEI according to the first paging scheme. For another example, the indication message may indicate the second paging scheme is to be performed, that is, the second paging scheme is activated. In this case, the first device 110 is required to monitor for the paging message on the set of POs in accordance with receipt of no PEI according to the second paging scheme.

In some example embodiments, the paging-related condition may be a set of POs comprising one PO. The configurations where the paging-related condition is met and the configurations where the paging-related condition is not met may be interchanged. In some other example embodiments, the paging-related condition may be the set of POs comprising more than one PO.

In some example embodiments, the paging-related condition may be a paging probability of the first device 110 being below a threshold paging probability. The second device 120 may further transmit, to the first device 110, a configuration message for configuring the threshold paging probability, for example, 10%, 20%, etc.

The configurations where the paging-related condition is met and the configurations where the paging-related condition is not met may be interchanged. In some other example embodiments, the paging-related condition may be the paging probability of the first device being not below the threshold paging probability.

In some example embodiments, the paging-related condition may be a paging cycle length of the first device being below a threshold paging cycle length. The second device 120 may further transmit, to the first device 110, a configuration message for configuring the threshold paging cycle length.

The configurations where the paging-related condition is met and the configurations where the paging-related condition is not met may be interchanged. In some other example embodiments, the paging-related condition may be the paging cycle length being not below the threshold paging cycle length.

For another example, the paging-related condition may be the first terminal device 110 operating in a mode other than the eDRX mode, and in this case, if the first terminal device 110 operates in the eDRX mode, the first paging scheme is to be activated. Otherwise, if the first device 110 operates in a mode other than the eDRX mode, the second paging scheme is to be activated.

In some example embodiments, the paging-related condition may be a subgroup comprising the first device 110 corresponding to a first assignment, and the first paging scheme is to be performed for the first assignment. In this case, the first device 110 may refrain from monitoring for the paging message on the set of POs in accordance with receipt of no early paging indication according to the first paging scheme.

In some other example embodiments, the paging-related condition may be the subgroup comprising the first device 110 corresponding to a second assignment different from the first assignment, and the second paging scheme is to be performed for the second assignment. In this case, the first device 110 may monitor for the paging message on the set of POs in accordance with receipt of no early paging indication according to the second paging scheme.

The first device 110 may further receive, from the first device 110, a bitmap for mapping subgroups and the first and second assignments. Alternatively, for subgroups 0 to N, the first device 110 may receive an indication message from the second device 120 for indicating a threshold X, where X and N are positive integers, and X≤N. For example, the indication message may indicate that the subgroups 0: X−1 correspond to the first assignment, and the subgroups X: N correspond to the second assignment. If there are only terminal devices in subgroups corresponding to the second assignment (i.e., applying behavior B) are to be paged, the second device 120 may not transmit PEI. If there is a mix of terminal devices corresponding to the first and second assignments (i.e., with behaviors of both subgroups), the first device 110 may receive the PEI with explicit indication of which subgroups are to be paged.

In some example embodiments, the paging-related condition may be a type of the first device 110 comprising one of a reduced capability device (e.g., RedCap), a device supporting enhanced mobile broadband or a device supporting MutiSIM. For example, the RedCap type of terminal devices may be paged based on the first paging scheme, while eMBB type of terminal devices may be paged based on the second paging scheme. For another example, the terminal device supporting MultiSIM may be paged based on the first paging scheme, and in a case that the PEI is missed, the terminal device will not monitor the paging channel on the POs, such that the number of times to monitor POs is minimized.

In some example embodiments where the second paging scheme is defined as a default paging scheme, the second device 120 may transmit, to the first device 110, paging downlink control information (DCI) with a target indicator for indicating the paging procedure performed based on the first paging scheme. Additionally, or alternatively, the second device 120 may transmit, to the first device 110, the paging DCI without a target indicator for indicating the paging procedure performed based on the second paging scheme. The target indicator may be an indicator of paging monitoring behavior according to PEI detection.

In some example embodiments where the first paging scheme is defined as a default paging scheme, the second device 120 may transmit, to the first device 110, paging DCI with the target indicator for indicating the paging procedure performed based on the second paging scheme. Additionally, or alternatively, the second device 120 may transmit, to the first device 110, the paging DCI without a target indicator for indicating the paging procedure performed based on the first paging scheme.

The target indicator may be, for example, the spare bits in the paging DCI. With the target indicator, the second device 120 may dynamically indicate a switching between the first paging scheme and the second paging scheme to the first device 110.

In some example embodiments, the target indicator for indicating the paging scheme may be included in a PEI transmitted to the first device 110. As such, all the terminal devices that receive the PEI with the target indicator may change their paging scheme.

In some example embodiments, the paging-related condition may be a reception mode of the first device 110 is the DRX mode. For example, if the reception mode of the first device 110 is the DRX mode, the paging-related condition is met, and the paging procedure is to be performed based on the first paging scheme. Otherwise, if the reception mode of the first device 110 is the eDRX mode, the paging-related condition is not met, and the paging procedure is to be performed based on the second paging scheme.

Likewise, the configurations where the paging-related condition is met and the configurations where the paging-related condition is not met may be interchanged. In some other example embodiments, the paging-related condition may be the reception mode of the first device 110 is the eDRX mode.

In some example embodiments where the first device 110 operates in the eDRX mode, the paging-related condition may be the PEI is not associated with a paging time window (PTW) of an extended discontinuous reception cycle, and the set of POs is within the PTW. In these embodiments, the second device 120 may perform the paging procedure with the first device 110 based on the first paging scheme during the PTW.

For example, the first device 110 that operates in eDRX may apply the second paging scheme when monitoring for a PEI before the PTW, such a PEI is associated with the PTW. For example, if the PEI indicates that the first device 110 shall monitor the paging channel or no PEI is transmitted before the PTW, the terminal device 110 may monitor the paging channel on the POs within the PTW. Moreover, for the POs within the PTW, the first device 110 may apply the first paging scheme per PEI, that is, the first device 110 would not monitor the paging channel on the POs within the PTW if no PEI is transmitted for the PO. In this case, the second device 120 may determine which PO is to page the first device 110 depending on its load and only transmit the PEI for the PO it intends to page.

It should be understood that the indication message, the configuration message as well as other additional message or information as described in details above may be transmitted via a RRC message or SIB. The scope of the present disclosure is not limited in this regard.

The example embodiments of the present disclosure provide an adaptive paging mechanism. The network device can switch UE behaviors in respect to PEI monitoring, and thus allowing the communication network to adapt the load of PEI signaling to a current network condition. Further, it is possible to vary the UE behaviors in respect to PEI monitoring from one terminal device to another depending on various factors, such as, a paging cycle, a paging probability, subgroups of the terminal device and so on. As such, a trade-off between the power consumption of the terminal device and a network load can be reached.

In some example embodiments, a first apparatus capable of performing the method 400 may comprise means for performing the respective steps of the method 400. The means may be implemented in any suitable form. For example, the means may be implemented in a circuitry or software module.

In some example embodiments, the first apparatus comprises: means for in accordance with a determination that no early paging indication is received from a second device during a set of indication occasions, determining whether a paging-related condition is met, the early paging indication addressing a set of paging occasions, the second device 120 serving the first apparatus; means for in accordance with a determination that the paging-related condition is met, refraining from monitoring for a paging message on the set of paging occasions; and means for in accordance with a determination that the paging-related condition is not met, monitoring for the paging message on the set of paging occasions.

In some example embodiments, the first apparatus further comprises: means for receiving, from the second device, a configuration message for configuring the paging-related condition. In some other example embodiments, the paging-related condition is preconfigured at the first apparatus and the second device.

In some example embodiments, the first apparatus further comprises: means for receiving, from the second device, an indication message for indicating a paging scheme to be performed for monitoring for the paging message. The indication message may indicate a first paging scheme is to be performed, the first apparatus refraining from monitoring for the paging message on the set of paging occasions in accordance with receipt of no early paging indication according to the first paging scheme. Alternatively, the indication message may indicate a second paging scheme is to be performed, the first apparatus monitoring for the paging message on the set of paging occasions in accordance with receipt of no early paging indication according to the second paging scheme.

In some example embodiments, the paging-related condition comprises one of the following: a number of the set of paging occasions not exceeding a threshold number of paging occasions, or the number of the set of paging occasions exceeding the threshold number of paging occasions.

In some example embodiments, the paging-related condition comprises one of the following: a paging probability of the first apparatus being below a threshold paging probability; or the paging probability of the first apparatus being not below the threshold paging probability, and wherein the threshold paging probability is configured by the second device.

In some example embodiments, the paging-related condition comprises one of the following: a paging cycle length of the first apparatus being below a threshold paging cycle length; or the paging cycle length being not below the threshold paging cycle length, and wherein the threshold paging cycle length is transmitted by the second device.

In some example embodiments, wherein the paging-related condition comprises one of the following: a subgroup comprising the first apparatus corresponding to a first assignment, a first paging scheme to be performed for the first assignment, the first apparatus refraining from monitoring for the paging message on the set of paging occasions in accordance with receipt of no early paging indication according to the first paging scheme, or the subgroup comprising the first device corresponding to a second assignment different from the first assignment, a second paging scheme is to be performed for the second assignment, the first apparatus monitoring for the paging message on the set of paging occasions in accordance with receipt of no early paging indication according to the second paging scheme.

In some example embodiments, the first assignment and the second assignment are indicated by a bitmap for mapping subgroups and the first and second assignments.

In some example embodiments, the paging-related condition comprises a type of the first apparatus comprising at least one of the following: a reduced capability device, a device supporting enhanced mobile broadband, or a device supporting MutiSIM.

In some example embodiments, the paging-related condition comprises one of the following: paging downlink control information received from the second device with a target indicator, or the paging downlink control information received from the second device without the target indicator.

In some example embodiments, the paging-related condition comprises one of the following: a reception mode of the first apparatus comprises a discontinuous reception mode, or the reception mode of the first apparatus comprises an extended discontinuous reception mode.

In some example embodiments, the first apparatus operates in an extended discontinuous reception mode, and the paging-related condition comprises the early paging indication being not associated with a paging time window of an extended discontinuous reception cycle, and the set of paging occasions is within the paging time window.

In some example embodiments, the early paging indication is associated with the paging time window, and the first apparatus further comprises: means for in accordance with receipt of no further early paging indication corresponding to one of the set of paging occasions, refraining from monitoring for the paging message on the paging occasion.

In some example embodiments, the first apparatus comprises a terminal device, and a second device comprises a network device.

In some example embodiments, a second apparatus capable of performing the method 500 may comprise means for performing the respective steps of the method 500.

The means may be implemented in any suitable form. For example, the means may be implemented in a circuitry or software module.

In some example embodiments, the second apparatus comprises: means for determining whether a paging-related condition is met; means for in accordance with a determination that the paging-related condition is met, performing a paging procedure with a first device based on a first paging scheme where no early paging indication is transmitted on a set of indication occasions in response to a paging channel between the first device and the second apparatus not to be monitored on a set of paging occasions corresponding to the early paging indication, the second apparatus serving the first device; and means for in accordance with a determination that the paging-related condition is not met, performing the paging procedure with the first device based on a second paging scheme where no early paging indication is transmitted on the set of indication occasions in response to the paging channel to be monitored on the set of paging occasions.

In some example embodiments, the second apparatus further comprises: means for transmitting, to the first device, a configuration message for configuring the paging-related condition. In some other example, embodiments, the paging-related condition is preconfigured at the first device and the second device.

In some example embodiments, the second apparatus further comprises: means for transmitting, to the first device, an indication message for indicating a paging scheme to be performed for monitoring for the paging message, the paging scheme selected from the first paging scheme and the second paging scheme.

In some example embodiments, the paging-related condition comprises one of the following: a number of the set of paging occasions not exceeding a threshold number of paging occasions, or the number of the set of paging occasions exceeding the threshold number of paging occasions.

In some example embodiments, the paging-related condition comprises one of the following: a paging probability of the first device being below a threshold paging probability; or the paging probability of the first device being not below the threshold paging probability. The second apparatus further comprises: means for transmitting, to the first device, a configuration message for configuring the threshold paging probability.

In some example embodiments, the paging-related condition comprises one of the following: a paging cycle length of the first device being below a threshold paging cycle length; or the paging cycle length being not below the threshold paging cycle length. The second apparatus further comprises: means for transmitting, to the first device, a configuration message for configuring the threshold paging cycle length.

In some example embodiments, the paging-related condition comprises one of the following: a subgroup comprising the first device corresponding to a first assignment, a first paging scheme to be performed for the first assignment, the first device refraining from monitoring for the paging message on the set of paging occasions in accordance with receipt of no early paging indication according to the first paging scheme; or the subgroup comprising the first device corresponding to a second assignment different from the first assignment, a second paging scheme is to be performed for the second assignment, the first device monitoring for the paging message on the set of paging occasions in accordance with receipt of no early paging indication according to the second paging scheme.

In some example embodiments, the second apparatus further comprises: means for transmitting, to the first device, a bitmap for mapping subgroups and the first and second assignments.

In some example embodiments, the paging-related condition comprises one of the following: a reduced capability device, a device supporting enhanced mobile broadband, or a device supporting MutiSIM.

In some example embodiments, the second apparatus further comprises: means for transmitting, to the first device, paging downlink control information with a target indicator for indicating the paging procedure performed based on the first paging scheme; or means for transmitting, to the first device, the paging downlink control information without a target indicator for indicating the paging procedure performed based on the second paging scheme.

In some example embodiments, the paging-related condition comprises one of the following: a reception mode of the first device comprises a discontinuous reception mode, or a reception mode of the first device comprises an extended discontinuous reception mode.

In some example embodiments, the first device operates in an extended discontinuous reception mode, and the paging-related condition comprises the early paging indication being not associated with a paging time window of an extended discontinuous reception cycle, and the set of paging occasions is within the paging time window.

In some example embodiments, the early paging indication is associated with the paging time window. The second apparatus further comprises: means for performing the paging procedure with the first device based on a first paging scheme during the paging time window.

In some example embodiments, the first device comprises a terminal device, and a second device comprises a network device.

Figure 6:
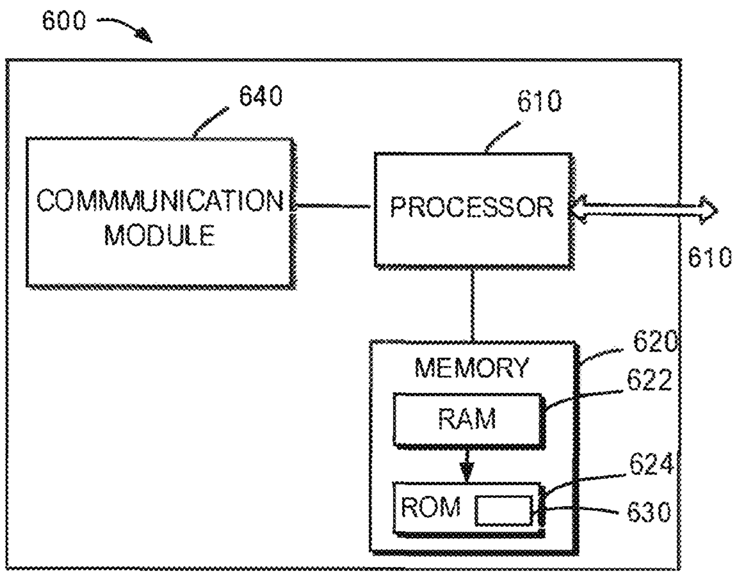
FIG. 6 illustrates a simplified block diagram of an apparatus that is suitable for implementing embodiments of the present disclosure.

FIG. 6 is a simplified block diagram of a device 600 that is suitable for implementing embodiments of the present disclosure. The device 600 may be provided to implement the communication device, for example the first device 110 and the second device 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 620. The processor 610 may perform any suitable actions and processing by loading the program 630 into the RAM 620.

The embodiments of the present disclosure may be implemented by means of the program 630 so that the device 600 may perform any process of the disclosure as discussed with reference to FIGS. 4 and 5. The embodiments of the present disclosure may also be implemented by hardware or by a combination of software and hardware.

In some embodiments, the program 630 may be tangibly contained in a computer readable medium which may be included in the device 600 (such as in the memory 620) or other storage devices that are accessible by the device 600.

Figure 7:
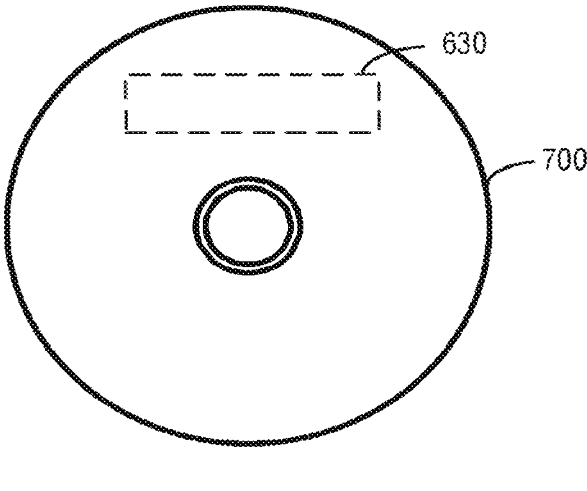
FIG. 7 illustrates a block diagram of an example computer readable medium in accordance with some embodiments of the present disclosure.

The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 or 500 as described above with reference to FIGS. 4-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:

at least one processor; and at least one memory including computer program code;

wherein the at least one memory and the computer program code are configured to, with the at least one processor, cause the first device to:

in accordance with a determination that no early paging indication is received from a second device during a set of indication occasions, determine whether a paging-related condition is met, the early paging indication addressing a set of paging occasions, the second device serving the first device;

in accordance with a determination that the paging-related condition is met, refrain from monitoring for a paging message on the set of paging occasions;

in accordance with a determination that the paging-related condition is not met, monitor for the paging message on the set of paging occasions; and receive, from the second device, a configuration message for configuring the paging-related condition.

2. The first device of claim 1, wherein the at least one memory and the computer program code are configured to, with the at least one processor, further cause the first device to:

receive, from the second device, an indication message for indicating a paging scheme to be performed for monitoring for the paging message, wherein the paging-related condition comprises one of the following:

the indication message indicating a first paging scheme is to be performed, the first device refraining from monitoring for the paging message on the set of paging occasions in accordance with receipt of no early paging indication according to the first paging scheme; or the indication message indicating a second paging scheme is to be performed, the first device monitoring for the paging message on the set of paging occasions in accordance with receipt of no early paging indication according to the second paging scheme.

3. The first device of claim 1, wherein the paging-related condition comprises one of the following:

a number of the set of paging occasions not exceeding a threshold number of paging occasions, or the number of the set of paging occasions exceeding the threshold number of paging occasions.

4. The first device of claim 1, wherein the paging-related condition comprises one of the following:

a paging probability of the first device being below a threshold paging probability; or the paging probability of the first device being not below the threshold paging probability, and wherein the threshold paging probability is configured by the second device.

5. The first device of claim 1, wherein the paging-related condition comprises one of the following:

a paging cycle length of the first device being below a threshold paging cycle length; or the paging cycle length being not below the threshold paging cycle length, and wherein the threshold paging cycle length is received by the second device.

6. The first device of claim 1, wherein the paging-related condition comprises one of the following:

a subgroup comprising the first device corresponding to a first assignment, a first paging scheme to be performed for the first assignment, the first device refraining from monitoring for the paging message on the set of paging occasions in accordance with receipt of no early paging indication according to the first paging scheme, or the subgroup comprising the first device corresponding to a second assignment different from the first assignment, a second paging scheme is to be performed for the second assignment, the first device monitoring for the paging message on the set of paging occasions in accordance with receipt of no early paging indication according to the second paging scheme.

7. The first device of claim 1, wherein the paging-related condition comprises a type of the first device comprising at least one of the following:

a reduced capability device, a device supporting enhanced mobile broadband, or a device supporting MultiSIM.

8. The first device of claim 1, wherein the paging-related condition comprises one of the following:

paging downlink control information received from the second device with a target indicator, or the paging downlink control information received from the second device without the target indicator.

9. The first device of claim 1, wherein the paging-related condition comprises one of the following:

a reception mode of the first device comprises a discontinuous reception mode, or the reception mode of the first device comprises an extended discontinuous reception mode.

10. The first device of claim 1, wherein the first device operates in an extended discontinuous reception mode, and the paging-related condition comprises the early paging indication being not associated with a paging time window of an extended discontinuous reception cycle, and the set of paging occasions is within the paging time window.

11. The first device of claim 10, wherein the early paging indication is associated with the paging time window, and the at least one memory and the computer program code are configured to, with the at least one processor, further cause the first device to:

in accordance with receipt of no further early paging indication corresponding to one of the set of paging occasions, refrain from monitoring for the paging message on the paging occasion.

12. A second device comprising:

at least one processor; and at least one memory including computer program code;

wherein the at least one memory and the computer program code are configured to, with the at least one processor, cause the second device to:

determine whether a paging-related condition is met;

in accordance with a determination that the paging-related condition is met, perform a paging procedure with a first device based on a first paging scheme where no early paging indication is transmitted on a set of indication occasions in response to a determination by the first device that a paging channel between the first device and the second device is not to be monitored on a set of paging occasions corresponding to the early paging indication, the second device serving the first device;

in accordance with a determination that the paging-related condition is not met, perform the paging procedure with the first device based on a second paging scheme where no early paging indication is transmitted on the set of indication occasions in response to a determination by the first device that the paging channel is to be monitored on the set of paging occasions; and transmit to the first device a configuration message for configuring the paging-related condition.

13. The second device of claim 12, wherein the at least one memory and the computer program code are configured to, with the at least one processor, further cause the second device to:

transmit, to the first device, an indication message for indicating a paging scheme to be performed for monitoring for the paging message, the paging scheme selected from the first paging scheme and the second paging scheme.

14. The second device of claim 12, wherein the paging-related condition comprises one of the following:

a paging probability of the first device being below a threshold paging probability; or the paging probability of the first device being not below the threshold paging probability, and wherein the at least one memory and the computer program code are configured to, with the at least one processor, further cause the second device to:

transmit, to the first device, a configuration message for configuring the threshold paging probability.

15. The second device of claim 12, wherein the paging-related condition comprises one of the following:

a paging cycle length of the first device being below a threshold paging cycle length; or the paging cycle length being not below the threshold paging cycle length, and wherein the at least one memory and the computer program code are configured to, with the at least one processor, further cause the second device to:

transmit, to the first device, a configuration message for configuring the threshold paging cycle length.

16. The second device of claim 12, wherein the paging-related condition comprises one of the following:

a subgroup comprising the first device corresponding to a first assignment, a first paging scheme to be performed for the first assignment, the first device refraining from monitoring for a paging message on the set of paging occasions in accordance with receipt of no early paging indication according to the first paging scheme, or the subgroup comprising the first device corresponding to a second assignment different from the first assignment, a second paging scheme is to be performed for the second assignment, the first device monitoring for the paging message on the set of paging occasions in accordance with receipt of no early paging indication according to the second paging scheme.

17. The second device of claim 12, wherein the at least one memory and the computer program code are configured to, with the at least one processor, further cause the second device to:

transmit, to the first device, paging downlink control information with a target indicator for indicating the paging procedure performed based on the first paging scheme; or transmit, to the first device, the paging downlink control information without the target indicator for indicating the paging procedure performed based on the second paging scheme.

18. A method comprising:

in accordance with a determination that no early paging indication is received from a second device during a set of indication occasions, determining, at a first device, whether a paging-related condition is met, the early paging indication addressing a set of paging occasions, the second device serving the first device;

in accordance with a determination that the paging-related condition is met, refraining from monitoring for a paging message on the set of paging occasions;

in accordance with a determination that the paging-related condition is not met, monitoring for the paging message on the set of paging occasions; and receiving, from the second device, a configuration message for configuring the paging-related condition.

* * * * *